United States Patent
Liu et al.

(10) Patent No.: US 11,475,258 B1
(45) Date of Patent: Oct. 18, 2022

(54) TIME AND PRINTED IMAGE HISTORY DEPENDENT TRC

(71) Applicant: Xerox Corporation, Norwalk, CT (US)

(72) Inventors: Chu-heng Liu, Penfield, NY (US); Seemit Praharaj, Webster, NY (US); Jason M. LeFevre, Penfield, NY (US); Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/412,988

(22) Filed: Aug. 26, 2021

(51) Int. Cl.
*G06K 15/02* (2006.01)
*G06K 15/00* (2006.01)
*G06K 15/10* (2006.01)

(52) U.S. Cl.
CPC ....... *G06K 15/1872* (2013.01); *G06K 15/102* (2013.01); *G06K 15/407* (2013.01)

(58) Field of Classification Search
CPC .................................................. G06K 15/1872
USPC ........................................................ 358/3.27
See application file for complete search history.

(56) References Cited

U.S. PATENT DOCUMENTS

| | | |
|---|---|---|
| 5,241,348 A | 8/1993 | Garavuso et al. |
| 6,753,987 B1 | 6/2004 | Farnung et al. |
| 7,054,030 B2 | 5/2006 | Maltz |
| 7,125,094 B2 | 10/2006 | Mizes |
| 7,239,819 B2 | 7/2007 | Gross et al. |
| 7,952,761 B2 | 5/2011 | Paul et al. |
| 8,355,595 B2 | 1/2013 | Bressan |
| 8,395,816 B2 | 3/2013 | Gross et al. |
| 8,672,436 B2 | 3/2014 | Powers et al. |
| 8,964,256 B2 | 2/2015 | Viturro et al. |
| 9,110,408 B1 | 8/2015 | Craig et al. |
| 10,207,452 B2 | 2/2019 | Mandel et al. |
| 10,821,747 B1 | 11/2020 | Mieney et al. |
| 2012/0026517 A1* | 2/2012 | Gross ............ H04N 1/6036 358/1.9 |
| 2020/0142341 A1 | 5/2020 | Robles Flores et al. |

* cited by examiner

*Primary Examiner* — Jacky X Zheng
(74) *Attorney, Agent, or Firm* — Gibb IP Law Firm, LLC

(57) ABSTRACT

A tone reproduction curve for a printing apparatus is periodically generated based on printed items produced by the printing apparatus. The tone reproduction curve is adjusted between periodic print-based generations of the tone reproduction curve by: determining the amount of area coverage of marking material applied by the printing apparatus during printing (in subsequent periods following an initial period in which the tone reproduction curve was generated); weighting the amount of area coverage in each of the subsequent periods differently based on how distant each of the subsequent periods is from the initial period to produce a weighted moving average of the area coverages of the marking material; and adjusting the tone reproduction curve based on the weighted moving average of the area coverages of the marking material.

20 Claims, 7 Drawing Sheets

TIME AND PRINTED IMAGE HISTORY DEPENDENT TRC

BACKGROUND

Systems and methods herein generally relate to printing methods and systems and more particularly to tone reproduction curves (TRCs) used with such systems.

Each individual printing device will accumulate small imperfections that build up over time. For example, different components can become worn (e.g., printheads) which can slightly change the appearance of the printed product when compared to the prints of an identical, but new, printing device.

In order to correct for such gradual printer changes, a tone reproduction curve is calculated for each printing device periodically. The tone reproduction curve is commonly stored as values in a look-up table (LUT). The values in the look-up table correlate target values for a color (e.g., target tone values) with digital input values (e.g., halftone dot area coverage amounts expressed, for example, in terms of levels, ratios or percentages) that will achieve those target values. Therefore, the image of a print job is adjusted to compensate for changes in an individual printing device to have the appearance of the printed image match the input image as closely as possible.

Tone reproduction curves are typically calculated by periodically printing and evaluating test images (i.e., printed test patches) to identify differences between target values for a particular color and actually achieved values. Each printing pixel (e.g., each jet of an inkjet printhead) is evaluated individually and each different printing pixel can have its own correction factor within the look-up table. Once identified, various different techniques can be used to compensate for these differences. For example, the look-up table may contain values that alter various physical actuators within the printer, to change jet actuation, developer bias, charge level, etc., to thereby compensate for the gradual changes occurring within the printing device.

SUMMARY

Methods herein periodically generate a tone reproduction curve for a printing apparatus based on printed items produced by the printing apparatus. The tone reproduction curve modifies job image data to compensate for image quality deviations.

Further, such methods adjust the tone reproduction curve between periodic print-based tone reproduction curve generations by determining the amount of area coverage of marking material applied by the printing apparatus during printing in subsequent periods following the initial period in which the tone reproduction curve was generated. These periods can be, for example, time periods, printed sheet counts, number of print jobs, etc.

The methods herein weight the amount of area coverage in each of the subsequent periods differently to produce a weighted moving average of the area coverages of the marking material. The weighting is based on how distant each of the subsequent periods is from the initial period and a relative measure of area coverage amounts of the marking material. Thus, these methods adjust the tone reproduction curve based on the weighted moving average of the area coverages of the marking material. For example, lower area coverage amounts of the marking material adjust the tone reproduction curve less relative to higher area coverage amounts of the marking material. The process of adjusting the tone reproduction curve includes altering values in a look up table (LUT).

The process of weighting the amount of area coverage of the marking material applied provides relatively lower weighting to area coverage amounts determined in subsequent periods that are relatively closest to the initial period (e.g., less recent periods) and provides relatively higher weighting to area coverage amounts determined in subsequent periods that are relatively distant to the initial period (e.g., more recent periods).

Also, the weighted moving average of the area coverages of the marking material is maintained separately for each location of each marking material application device (e.g., each jet of an inkjet printhead) within each print head of the printing apparatus. Therefore, the weighting of the amount of area coverage of the marking material applied can produce different weighted moving averages of the area coverages of the marking material for adjacent marking material application devices (e.g., adjacent jets) within print heads of the printing apparatus.

Various printing apparatuses herein include (among other components) a processor and a printing engine operatively connected to the processor. The processor is adapted to periodically generate a tone reproduction curve based on printed items produced by the printing engine. The tone reproduction curve modifies job image data to compensate for image quality deviations.

The processor is also adapted to adjust the tone reproduction curve between periodic print-based generations of the tone reproduction curve. The processor does this by determining the amount of area coverage of marking material applied by the printing engine during printing in subsequent periods following an initial period in which the tone reproduction curve was generated. These periods can be, for example, time periods, printed sheet counts, number of print jobs, etc.

Further, the processor is adapted to weight the amount of area coverage in each of the subsequent periods differently based on how distant each of the subsequent periods is from the initial period to produce a weighted moving average of the area coverages of the marking material. The processor further adjusts the tone reproduction curve based on the weighted moving average of the area coverages of the marking material.

The weighting of the amount of area coverage of the marking material applied provides relatively lower weighting to area coverage amounts determined in the subsequent periods that are relatively closest to the initial period (e.g., less recent periods) and provides relatively higher weighting to area coverage amounts determined in the subsequent periods that are relatively distant to the initial period (e.g., more recent periods).

The weighted moving average of the area coverages of the marking material is maintained separately for each location of each marking material application device (e.g., each jet) within each print head of the printing engine. The weighting of the amount of area coverage of the marking material applied can thus produce different weighted moving averages of the area coverages of the marking material for adjacent marking material application devices (e.g., adjacent jets) within print heads of the printing engine.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, a tone reproduction curve is calculated using printed test patches for each printing device periodically; however, between such periodic calculations, changes can occur that affect image quality (IQ) and the static test patch-based tone reproduction curve does not compensate for changes that occur between new test patch-based tone reproduction curve calculations. Some devices use a density optimization routine called sTRC (spatial TRC) that is executed at certain intervals. These account for printhead related non-uniformity and reduce the streak on a print.

One notable degradation that can occur between period TRC calculations is image content dependent streaks. Such streaks depend on the images that has been printed in the near past (or since the last reset/calibration) and such streaks can develop and evolve. To the first order, the problem can be stated as ink coverage ghosting, which occurs as the nozzles that have printed a lot of (or very little) ink can produce darker (or lighter) densities. This can give rise to a streaky print.

In light of such issues, the systems and methods herein produce time dependent sTRC to predictively compensate for the non-uniformity from various sources between test patch-based sTRC measurements/calibrations. In particular, the systems and methods herein produce an ink coverage dependent sTRC to predictively compensate for the non-uniformity associated with the ink usage variations across x locations (across the process direction) from images printed in the near past. In one example "x" locations are individual jets (pixels) of the printhead. With systems and methods herein, a weighted moving average of the ink usage at each x location is calculated and updated after each printed sheet. This weighted ink usage function WI(x,t) is used to predict the suitable adjustment to the original sTRC at the last reset/calibration point. This weighting function has the highest weight for the previous print and gradually decays for prints that were printed longer and longer ago.

For example, if an image is printed many times (say 100-1000 pages) with the process direction going up, a density "ghosting" will develop. The streaks of the subsequent prints will match the ink usage pattern very well. Therefore, the systems and methods herein provide a predictive sTRC based on time and ink usage history.

Figure 1:
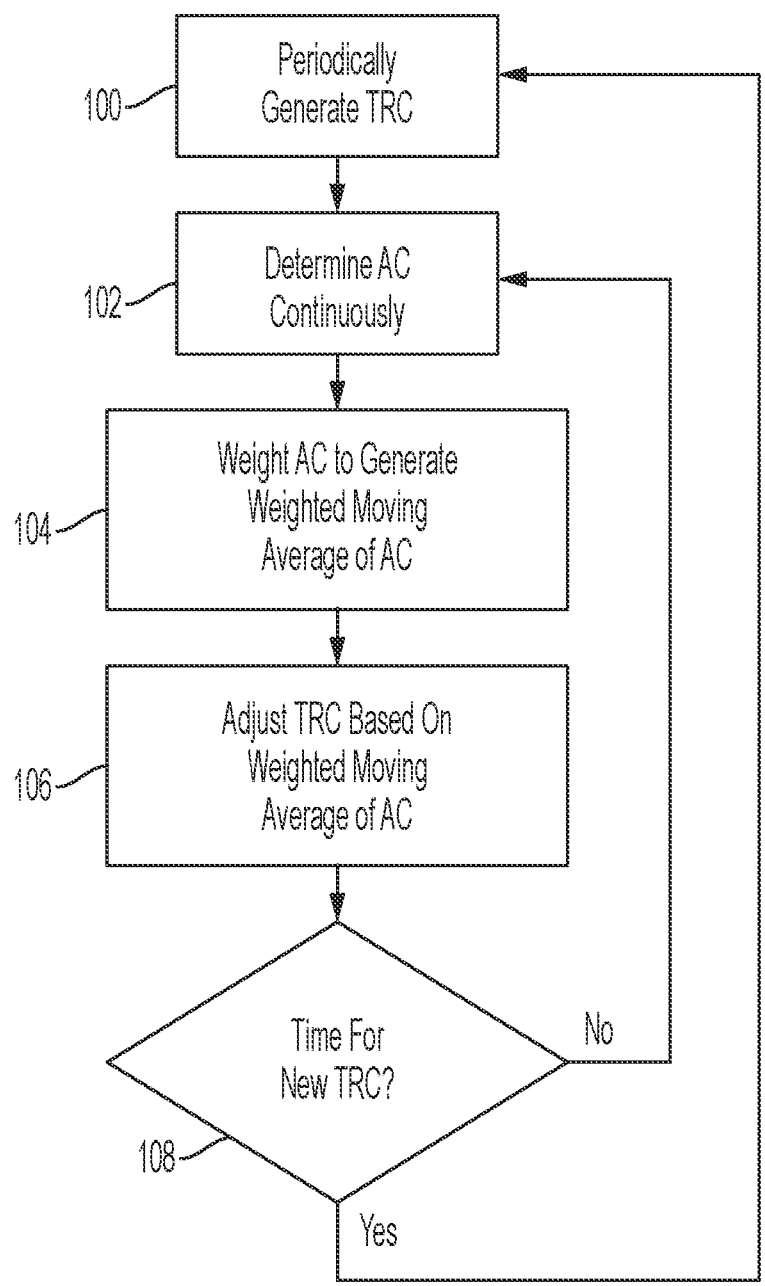
FIG. 1 is a flow diagram of various methods herein.

FIG. 1 is flowchart illustrating exemplary methods herein. In item 100, these methods periodically generate a tone reproduction curve for a printing apparatus based on printed items produced by the printing apparatus. The tone reproduction curve is generated in item 100 using some form of printing that is scanned and evaluated, such as test patches printed on sheets or on a belt. This test patch-based tone reproduction curve generated in item 100 is stored as a look-up table that is used to modify job image data to compensate for image quality deviations.

Further, such methods adjust this test patch-based tone reproduction curve between periodic print-based tone reproduction curve generations 100. This is done by, as shown in item 102, determining the amount of area coverage of marking material (e.g., ink, toner, etc.) applied by the printing apparatus during printing in subsequent periods following the initial period in which the tone reproduction curve was generated. These periods can be, for example, time periods, printed sheet counts, number of print jobs, etc.

In item 104, the methods herein weight the amount of ink area coverage in each of the subsequent periods differently to produce a weighted moving average of the area coverages of the marking material. The weighting is based on how distant each of the subsequent periods is from the initial period and a relative measure of area coverage amounts of the marking material.

The process of weighting the amount of area coverage of the marking material applied in item 104 provides relatively lower weighting to area coverage amounts determined in subsequent periods that are relatively closest to the initial period (e.g., less recent periods) and provides relatively higher weighting to area coverage amounts determined in subsequent periods that are relatively distant to the initial period (e.g., more recent periods).

Also, the weighted moving average of the area coverages of the marking material is maintained separately for each location (pixel) of each marking material application device (e.g., each jet of an inkjet printhead) within each print head of the printing apparatus in item 104. Therefore, the weighting of the amount of area coverage of the marking material applied can produce different weighted moving averages of the area coverages of the marking material for adjacent marking material application devices (e.g., adjacent jets) within print heads of the printing apparatus in item 104.

With the information produced in item 102-104, these methods can then adjust the tone reproduction curve based on the weighted moving average of the area coverages of the marking material in item 106. For example, in item 106 lower area coverage amounts of the marking material (in item 104) adjust the tone reproduction curve less relative to higher ink area coverage amounts of the marking material. The process of adjusting the tone reproduction curve in item 106 includes altering values in the corresponding look up table.

As noted above, the generation of a new test patch-based tone reproduction curve in item 100 occurs periodically. Thus, item 108 determines whether enough "periods" (e.g., time periods, number of sheets, number of jobs, etc.) have occurred/expired since the last generation of a new test patch-based tone reproduction curve calculated in item 100. If enough periods have expired, processing returns from item 108 to item 100 to calculate a new tone reproduction curve using newly printed test patches. Otherwise, if not enough periods have expired, processing returns from item 108 to item 102 so as to continuously repeat the ink area coverage determination (102), the weighting (104), and the adjusting of the tone reproduction curve (106) to keep the tone reproduction curve constantly accurate (e.g., between print jobs, and even between prints within print jobs).

In greater detail, as part of the periodic calculation of the tone reproduction curve, the system and methods herein reset the printhead (with a purge and etc.) and perform a test patch-based sTRC calibration/measurement. In between test patch-based sTRC calculations, the systems and methods herein monitor the ink usage at each x location of the printhead with a weighted moving average: WI(x, t).

These processes adjust the sTRC with sTRC(WI(x,t)) every page, at fixed period intervals, or when the system decides to make an adjustment. The actual predictive model used for each x location and WI(x, t) is different for each printing system or printer and is based on empirical experimental data and mathematical approximations and interpolations. However, in general the sTRC will be stable after a long run of constant ink usage area coverage (AC) which can be represented sTRC (x,AC).

The sTRC right after the test patch-based new sTRC reset/calibration is very close to the sTRC with near zero ink coverage (e.g., when no printing has occurred, no ink has been used). Thus, with low AC, the sTRC does not change much (e.g., sTRC(x, at T=0)~=sTRC (x,AC=0)). The processing herein uses sTRC(x,t=0) and modeling to predict/generate sTRC(x,AC) at all levels of AC: from 0 to 1. Therefore, a set of sTRC(x,AC) (at all AC's) is ready after each calibration.

After a sequence of prints, the impact of printing on sTRC can be characterized by the weighted ink usage WI(x,t) (e.g., WI(x,t)=Sum(c(i)*AC(x, t−i), i=(1 to n))). Where c(i) is the weight, with Sum(c(i),i=1 to n)=1 (normalization). Also, c(i) is a decreasing function of i and approaches zero when n is sufficiently large (for example, 100, or 1000). Further, AC(x,t−i) is the area coverage of the ith image before the current image t, at x location.

With this sTRC(x,WI(x,t)) is the function which can be simply written as sTRC(WI(x,t)). Processing herein, from sTRC(x,t=0), to generate sTRC(x,AC) to the first order uses approximation: sTRC(x,AC)~=sTRC(x,t=0)+delta_sTRC (AC) with the assumption that delta_sTRC(AC) is independent of x location for the first order correction. While sTRC(x,t=0) is measured/created after each calibration, delta_sTRC(AC) can be based on offline data and model prediction.

Therefore, the systems and methods herein provide a time dependent and ink usage dependent sTRC. These sTRC are used to correct ink usage induced density non-uniformity. The ink usage impact on the density is characterized through an x position resolved, weighted moving average of the ink usage of the set of images that have been printed before the current page. With these features there is improved IQ and IQ stability and this also enables longer intervals between test patch-based sTRC calibration/interruption.

Figure 2:
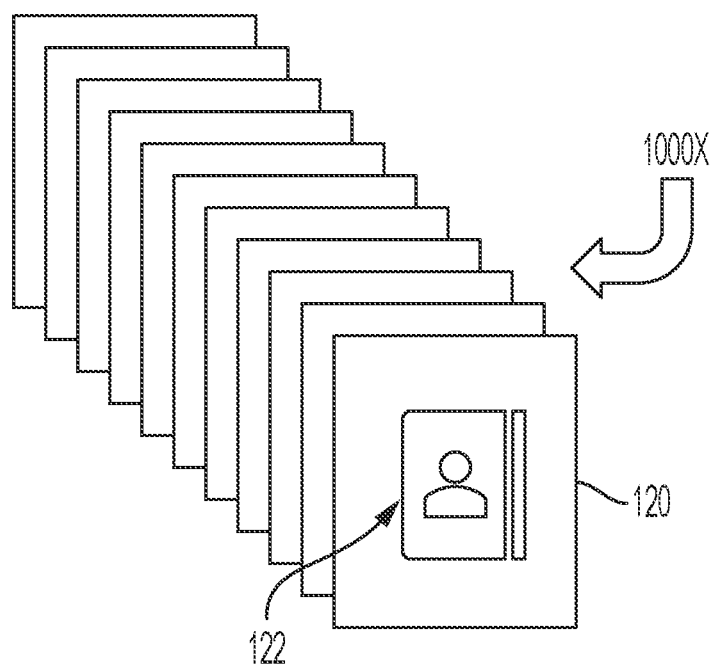
FIGS. 2-4 are schematic diagrams conceptually illustrating processing performed by systems and methods herein.
Figure 3:
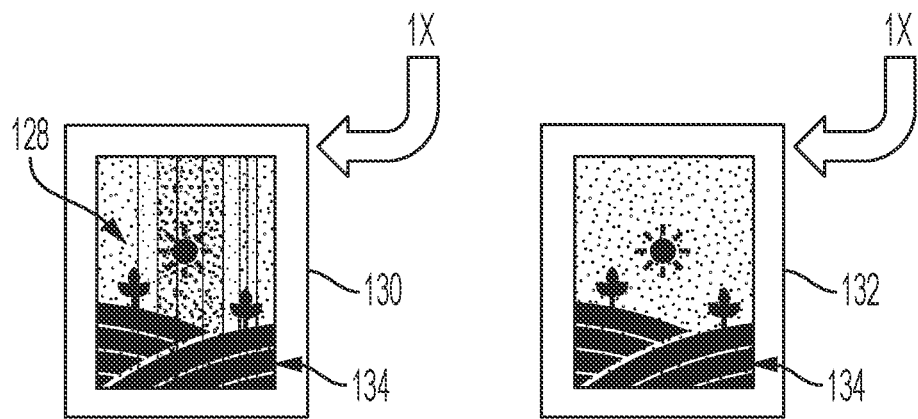

FIGS. 2 and 3 are illustrations showing an example of the results of the processing discussed in FIG. 1. Specifically, FIG. 2 illustrates the printed result 120 of a print job requesting 1000 printed copies of an image 122. FIG. 3 illustrates a print job requesting one printed copy of an image 134. The print 130 in FIG. 3 occurs immediately (e.g., less than 1 minute, less than 1 second, etc., and without any intervening printing) after the print job in FIG. 2 and is made not using the processing shown in FIG. 1, while the print 132 in FIG. 3 also occurs immediately (e.g., less than 1 minute, less than 1 second, etc., and without any intervening printing) after the print job in FIG. 2 but is made using the processing shown in FIG. 1.

The extended (e.g., 1000 prints) print job for image 122 shown in FIG. 2 can fatigue some of the jets of the printhead and if the subsequent print job for image 134 (FIG. 3) immediately follows the previous print job for image 122 (FIG. 2) a ghost streak image 128 of the previous image 122 can appear in the printed copy 130. However, because the processing shown in FIG. 1 accounts for the fatigued printhead jets when producing the weighted moving average of area coverage (item 104, FIG. 1) and adjusts the tone reproduction curve accordingly (item 106, FIG. 1), the ghost streak image 128 does not appear in the printed copy 132. Elimination of such ghost streak images 128 decreases waste and increases user satisfaction.

Figure 4:
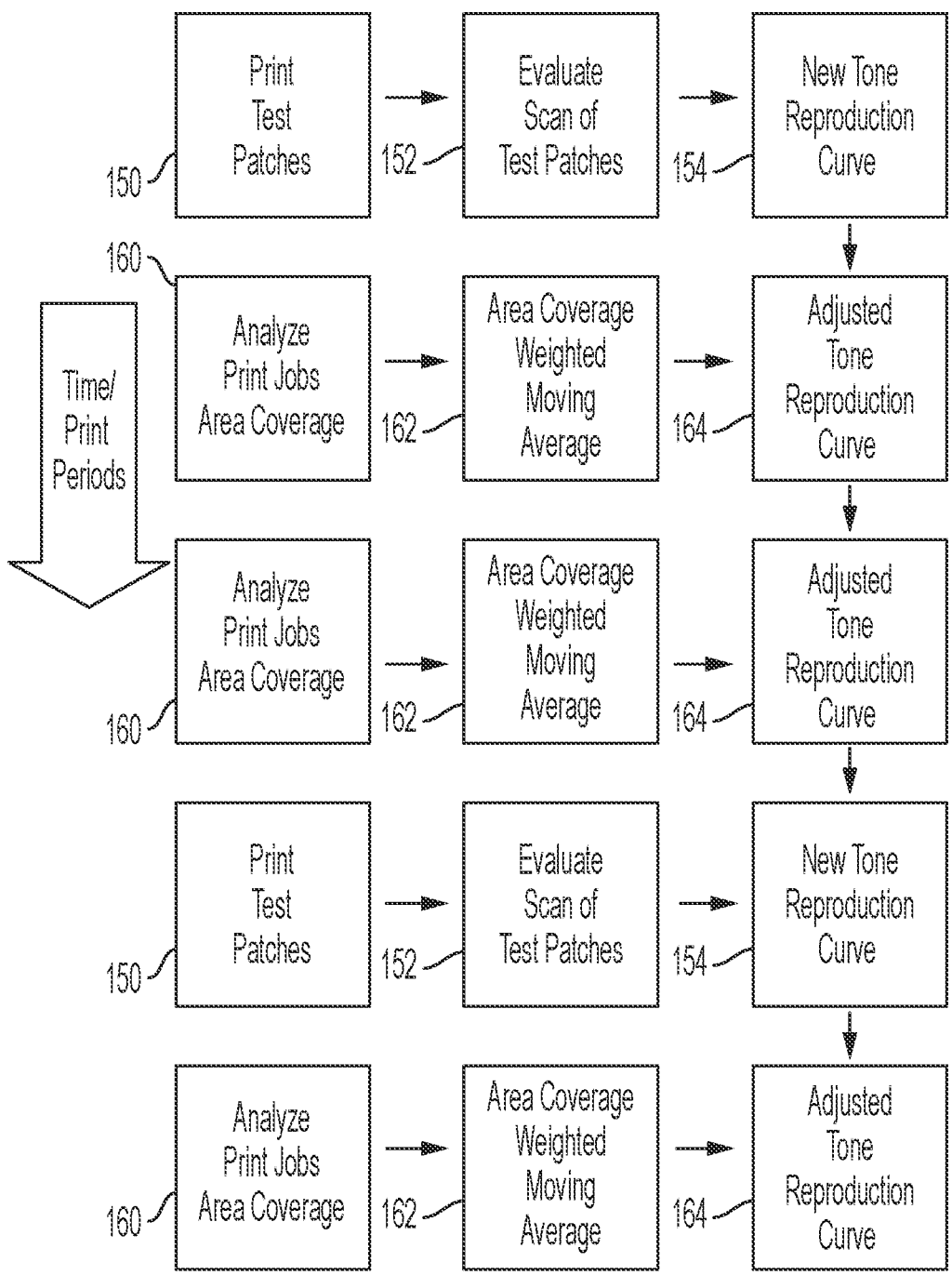

FIG. 4 shows the processing shown in FIG. 1 during successive time or print periods. Specifically, as shown in FIG. 4, the generation of the tone reproduction curve (FIG. 1, item 100) can occur by printing test patches 150 on sheets of media or on the transport belt, evaluating a scan of the test patches 152, and using the evaluation to calculate a new tone reproduction curve 154, which can be maintained in look-up tables (LUTs).

In between such new tone reproduction curve generation processes (150, 152, 154), in later periods the actual (non-testing) print jobs ink area coverage can be evaluated 160 to determine the ink area coverage for each jet (printhead pixel) used by the actual print job (FIG. 1, item 102) and the area coverage weighted moving average for each jet (printhead pixel) 162 can be found (FIG. 1, item 104). This allows the processes herein to change the new tone reproduction curve 154 into an adjusted tone reproduction curve 164 (FIG. 1, item 106) or allows a previous adjusted tone reproduction curve 164 to be readjusted.

While FIG. 4 illustrates two instances of adjusting the tone reproduction curve 164 between instances of creating a new tone reproduction curve 154, in reality each successive actual, non-test print job adjusts the tone reproduction curve. Therefore, the area coverage is determined (FIG. 1, item 102) continuously during each print job and the tone reproduction curve is continuously adjusted (FIG. 1, item 106) between print jobs and during print jobs. In this way, the effects of previous printing actions are continuously accounted for and compensated for to eliminate the instances of ghosting (FIG. 3, item 128).

Figure 5:
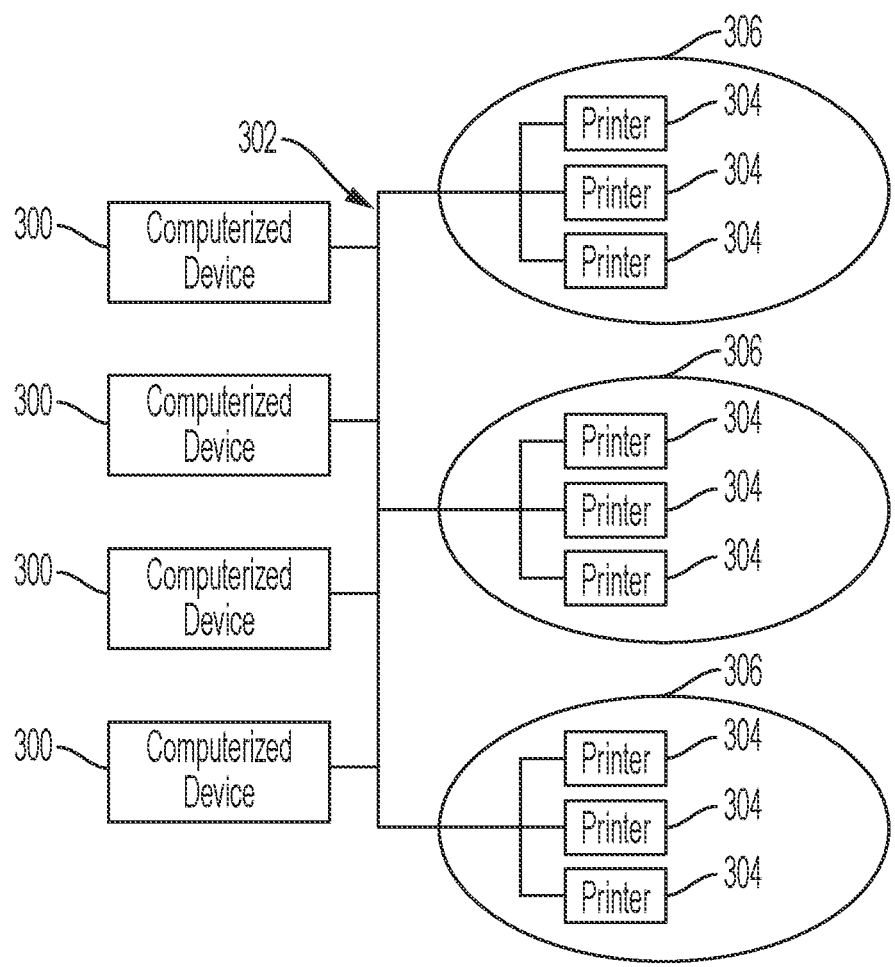
FIG. 5 is a schematic diagram illustrating systems herein.

As shown in FIG. 5, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 6:
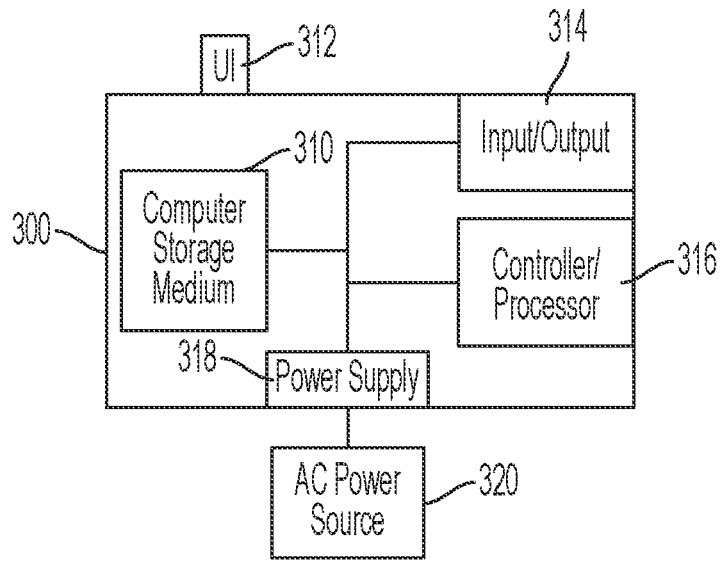
FIGS. 6-9 are schematic diagrams illustrating devices herein.

FIG. 6 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 6, a body housing has one or more functional components that operate on power supplied from an alternating current (AC) source 320 by the power supply 318. The power supply 318 can comprise a common power conversion unit, power storage element (e.g., a battery, etc.), etc.

Figure 7:
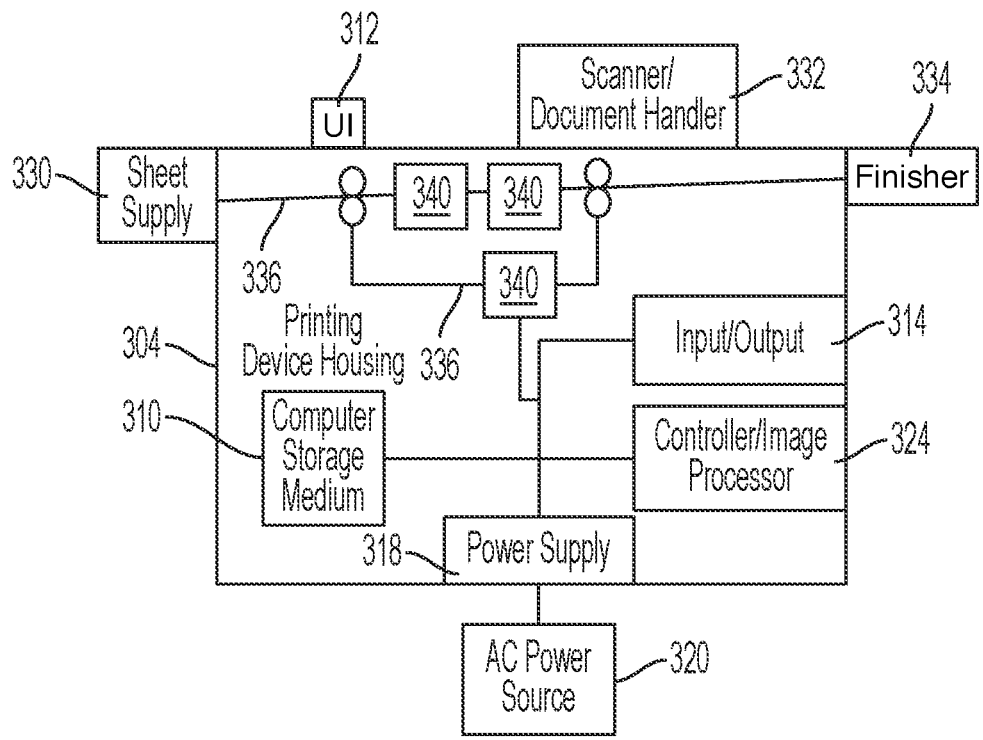

FIG. 7 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that is different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

Various printing apparatuses 304 herein include (among other components) a processor 324 and a printing engine 340 operatively connected to the processor 324. The processor 324 is adapted to periodically generate a tone reproduction curve based on printed items produced by the printing engine 340. The tone reproduction curve modifies job image data to compensate for image quality deviations.

The processor 324 is also adapted to adjust the tone reproduction curve between periodic print-based generations of the tone reproduction curve. The processor 324 does this by determining the amount of area coverage of marking material applied by the printing engine 340 during printing in subsequent periods following an initial period in which the tone reproduction curve was generated. These periods can be, for example, time periods, printed sheet counts, number of print jobs, etc.

Further, the processor 324 is adapted to weight the amount of area coverage in each of the subsequent periods differently based on how distant each of the subsequent periods is from the initial period to produce a weighted moving average of the area coverages of the marking material. The processor 324 further adjusts the tone reproduction curve based on the weighted moving average of the area coverages of the marking material.

The weighting of the amount of area coverage of the marking material applied provides relatively lower weighting to area coverage amounts determined in the subsequent periods that are relatively closest to the initial period (e.g., less recent periods) and provides relatively higher weighting to area coverage amounts determined in the subsequent periods that are relatively distant to the initial period (e.g., more recent periods).

The weighted moving average of the area coverages of the marking material is maintained separately for each location of each marking material application device (e.g., each jet) within each print head of the printing engine 340. The weighting of the amount of area coverage of the marking material applied can thus produce different weighted moving averages of the area coverages of the marking material for adjacent marking material application devices (e.g., adjacent jets) within print heads of the printing engine 340.

Figure 8:
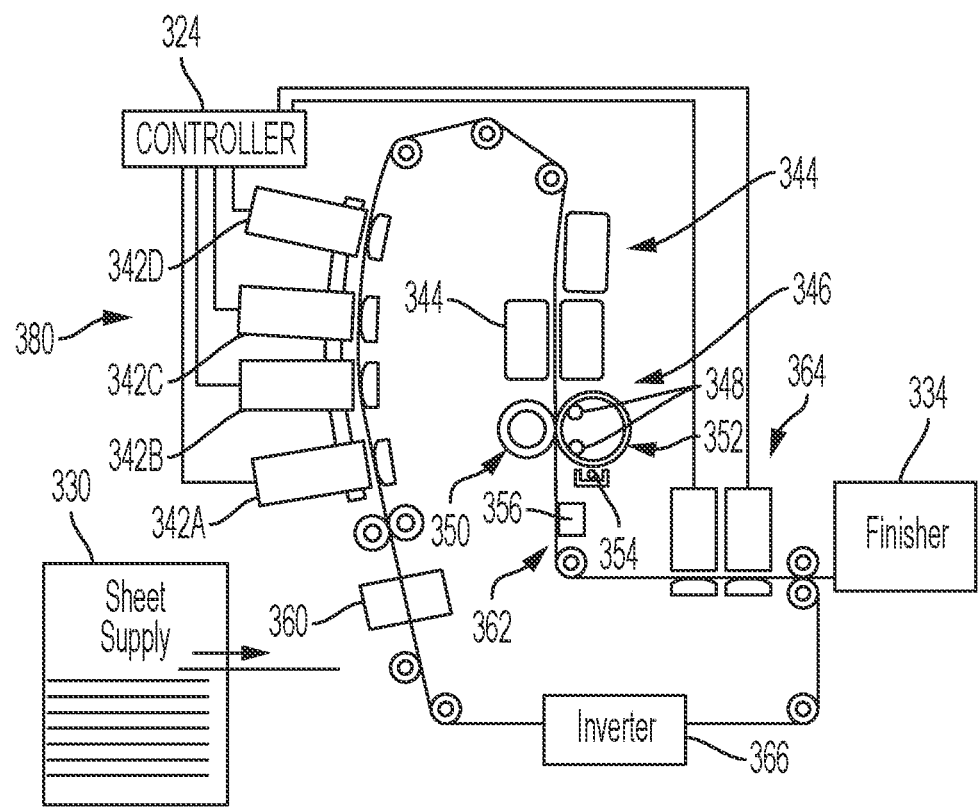
Figure 9:
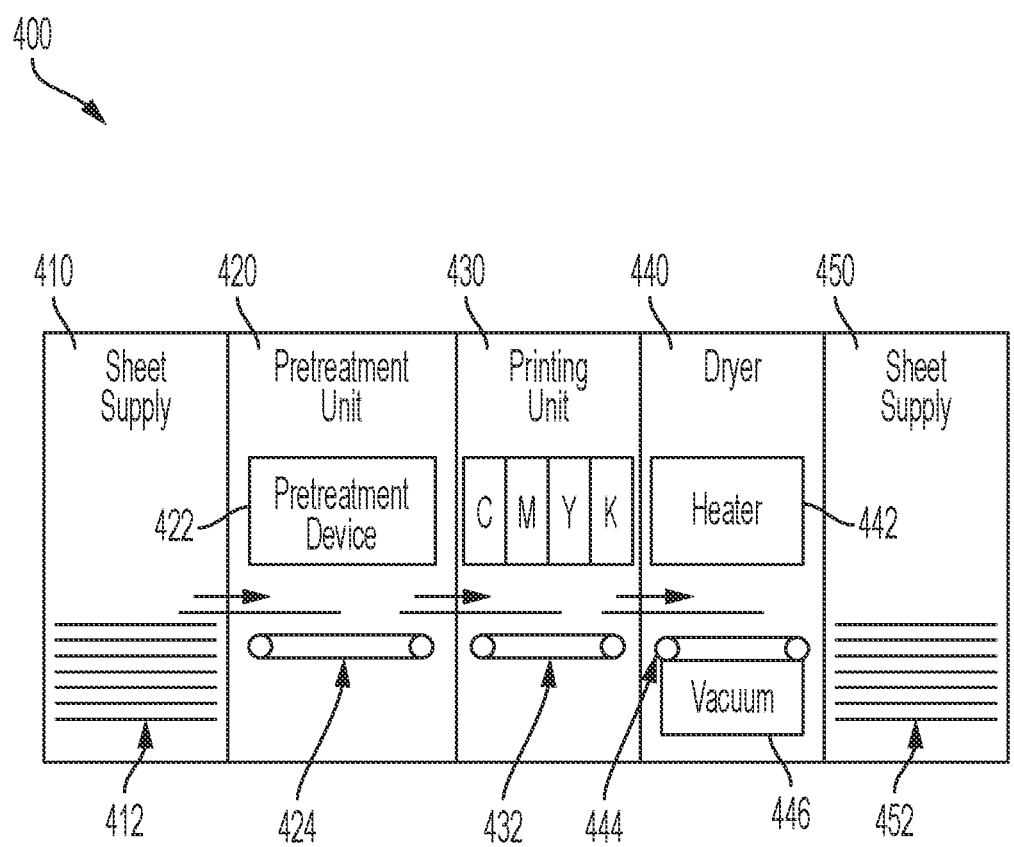

The one or more printing engines 340 are intended to illustrate any marking device that applies a marking material (toner, inks, etc.) to continuous media or sheets of media, whether currently known or developed in the future and can include, for example, devices that use an ink jet imaging system, as shown in FIG. 8, or a high-speed aqueous imaging system, as shown in FIG. 9.

More specifically, FIG. 8 illustrates one example of the above-mentioned printing engine(s) 380 that is an ink jet imaging system. In this example, the imaging apparatus 380 is in the form of an ink jet printer that employs one or more ink jet printheads, each with an associated solid ink supply (342A-342D). The exemplary direct-to-sheet phase-change ink jet imaging system 380 includes a media supply and handling system 330 configured to supply media (e.g., paper, plastic, or other printable material). A media conditioner 360, printed sheet conditioner 344, coating station 364, and finisher 334.

The media is propelled by a sheet transport 362 that can include a variety of motors rotating one or more rollers. For duplex operations, an inverter 366 may be used to flip the sheet over to present a second side of the media to the printheads 342A-342D. The media conditioner 360 includes, for example, a pre-heater. The pre-heater brings the media to an initial predetermined temperature that is selected for desired image characteristics corresponding to the type of media being printed as well as the type, colors, and number of inks being used. The pre-heater may use contact, radiant, conductive, or convective heat to bring the media to a target preheat temperature.

The media is transported through a printing station that includes a series of color printheads 342A-342D, each color unit effectively extending across the width of the media and being able to place ink directly (i.e., without use of an intermediate or offset member) onto the moving media. Each of the printheads may eject a single color of ink, one for each of the colors typically used in color printing, namely, cyan, magenta, yellow, and black (CMYK). A controller 324 generates timing signals for actuating the ink jet ejectors in the printheads 342A-342D in synchronization with the passage of the media to enable the four colors to be ejected with a reliable degree of accuracy for registration of the differently colored patterns to form four primary-color images on the media.

The ink jet ejectors are actuated by the firing signals to correspond to image data processed by the controller 324 that may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction, such as for spot-color applications and the like.

Each of color printheads 342A-342D may include at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads and is configured to reposition the print bar by sliding the print bar along the cross-process axis of the media web. In alternative embodiments, an actuator system may be used that does not physically move the printheads but redirects the image data to different ejectors in each head to change head position.

The printer may use liquid ink or "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. As used herein, liquid ink refers to melted solid ink, heated gel ink, or other known forms of ink, such as aqueous inks, ink emulsions, ink suspensions, ink solutions, or the like.

Associated with each color unit is a backing member, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature.

Following the printing zone along the media path are one or more "mid-heaters" 344. A mid-heater 344 may use contact, radiant, conductive, and/or convective heat to control a temperature of the media and particularly to bring the media to a temperature suitable for desired properties when passing through the spreader 346.

The fixing assembly in the form of the "spreader" 346 is configured to apply heat and/or pressure to the media to fix the images to the media. The function of the spreader 346 is to take what are essentially droplets, strings of droplets, or lines of ink on the sheet and smear them out by pressure and, in some systems, heat, so that spaces between adjacent drops are filled and image solids become uniform. The spreader 346 may include rollers, such as image-side roller 352 and pressure roller 350, to apply heat and pressure to the media, either of which can include heating elements, such as heating elements 348, to bring the media to a predetermined temperature. The spreader 346 may also include a cleaning/oiling station 354 associated with image-side roller 352. The station 354 cleans and/or applies a layer of some release agent or other material to the roller surface. A coating station 364 applies a clear ink to the printed media to modify the gloss and/or to help protect the printed media from smearing or other environmental degradation following removal from the printer.

Operation and control of the various subsystems, components and functions of the imaging system are performed with the aid of the controller 324. The controller 324 may be implemented with general or specialized programmable processors that execute programmed instructions. The controller 324 may be operatively coupled to the print bar and printhead actuators of color printheads 342A-342D in order to adjust the position of the print bars and printheads along the cross-process axis of the media web. In particular, the controller may be operable to shift one or more, or all, of the color units laterally or transverse to the process direction.

The imaging system may also include an optical imaging system 356 that is configured in a manner similar to that for creating the image to be transferred to the web. The optical imaging system is configured to detect, for example, the presence, intensity, and/or location of ink drops jetted onto the receiving member by the ink jets of the printhead assembly. The imaging system may incorporate a variety of light sources capable of illuminating the printed web sufficient to detect printing errors that may be attributable to a faulty or defective ink jet or printhead. The imaging system 356 further includes an array of light detectors or optical sensors that sense the image reflected from the printed web prior to discharge. The controller 324 analyzes the information from the imaging system 356 to determine, among other things, whether a failure or an ink jet or printhead has occurred. The location of the defective printing element is identified and made available to the maintenance technician during a diagnosis procedure. The controller 324 may also use the data obtained from the imaging system 356 to adjust the registration of the color units such as by moving a color unit or one or more printheads. This image data may also be used for color control.

FIG. 9 illustrates an inkjet or aqueous ink printer system 400 that is one of the printers 304, discussed above. Specifically, FIG. 9 illustrates a high-speed ink jet or aqueous ink image producing machine or printer 400. The printer 400 includes a media supply 410, a pretreatment unit 420, a printing unit 430, a dryer 440, and a sheet stacker 450. The media supply 410 stores a plurality of media sheets 412 for printing by the printer 400.

The pretreatment unit 420 includes at least one pretreatment device 422 and transport belt 424. The pretreatment unit 420 receives the media sheets from the media supply 410 and transports the media sheets in a process direction (block arrows in FIG. 9) through the pretreatment unit 420. The pretreatment device 422 conditions the media sheets and prepares the media sheets for printing in the printing unit 430. The pretreatment unit 420 may include, for example, a coating device that applies a coating to the media sheets, a drying device that dries the media sheets, and/or a heating device that heats the media sheets to a predetermined temperature. In some embodiments, the printer 400 does not include a pretreatment unit 420 and media sheets are fed directly from the media supply 410 to the printing unit 430. In other embodiments, the printer 400 may include more than one pretreatment unit.

The printing unit 430 includes at least one marking unit transport belt 432 that receives the media sheets from the pretreatment unit 420 or the media supply 410 and transports the media sheets through the printing unit 430. The printing unit 430 further includes at least one printhead (labeled CMYK in FIG. 9 to represent the standard cyan, magenta, yellow, and black color printheads; however any color printheads could be used). The printhead (CMYK) ejects aqueous ink onto the media sheets as the media sheets are transported through the printing unit 430. In the illustrated embodiment, the printing unit 430 includes four printheads (CMYK), each of which ejects one of cyan, magenta, yellow, and black ink onto the media sheets. The reader should appreciate, however, that other embodiments include other printhead arrangements, which may include more or fewer printheads, arrays of printheads, etc.

The dryer 440 includes a heater 442 and a vacuum drying belt 444 that receives the media sheets from the printing unit 430. A vacuum plenum 446 connects to a vacuum blower or the plumbing that is connected to a vacuum blower at one side in the cross-process direction. The sheet stacker 450 receives and stacks the printed sheets 452.

While FIGS. 8 and 9 illustrate four marking stations adjacent or in contact with a rotating belt, which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

The print media is then transported by the sheet output transport 336 to output trays or a multi-function finishing station 334 performing different desired actions, such as stapling, hole-punching and C or Z-folding, a modular booklet maker, etc., although those ordinarily skilled in the art would understand that the finisher/output tray 334 could comprise any functional unit.

As would be understood by those ordinarily skilled in the art, the printing devices shown above are only examples and the systems and methods herein are equally applicable to other types of printing devices that may include fewer components or more components. For example, while a limited number of printing engines and paper paths are illustrated, those ordinarily skilled in the art would understand that many more paper paths and additional printing engines could be included within any printing device used with systems and methods herein.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   periodically generating a tone reproduction curve for a printing apparatus based on printed items produced by the printing apparatus; and
   adjusting the tone reproduction curve between periodic print-based generations of the tone reproduction curve by:
      determining an amount of area coverage of marking material applied by the printing apparatus during printing in subsequent periods following an initial period in which the tone reproduction curve was generated;
      weighting the amount of area coverage in each of the subsequent periods differently based on how distant each of the subsequent periods is from the initial period to produce a weighted moving average of area coverages of the marking material; and
      adjusting the tone reproduction curve based on the weighted moving average of the area coverages of the marking material.

2. The method according to claim 1, wherein the weighting of the amount of area coverage of the marking material applied comprises:
   providing relatively lower weighting to area coverage amounts determined in the subsequent periods that are relatively closest to the initial period; and
   providing relatively higher weighting to area coverage amounts determined in the subsequent periods that are relatively distant to the initial period.

3. The method according to claim 1, wherein the weighted moving average of the area coverages of the marking material is maintained separately for each location of each marking material application device within each print head of the printing apparatus.

4. The method according to claim 1, wherein the weighting of the amount of area coverage of the marking material applied produces different weighted moving averages of the area coverages of the marking material for adjacent marking material application devices within print heads of the printing apparatus.

5. The method according to claim 1, wherein the initial period and the subsequent periods comprise at least one of: time periods; and printed sheet counts.

6. The method according to claim 1, wherein the tone reproduction curve modifies job image data to compensate for image quality deviations.

7. The method according to claim 1, wherein the adjusting of the tone reproduction curve comprises altering values in a look up table (LUT).

8. A method comprising:
   periodically generating a tone reproduction curve for a printing apparatus based on printed items produced by the printing apparatus; and
   adjusting the tone reproduction curve between periodic print-based generations of the tone reproduction curve by:
      determining an amount of area coverage of marking material applied by the printing apparatus during printing in subsequent periods following an initial period in which the tone reproduction curve was generated;

weighting the amount of area coverage in each of the subsequent periods differently to produce a weighted moving average of area coverages of the marking material, wherein the weighting is based on:
  how distant each of the subsequent periods is from the initial period; and
  a relative measure of area coverage amounts of the marking material; and
adjusting the tone reproduction curve based on the weighted moving average of the area coverages of the marking material,
wherein lower area coverage amounts of the marking material adjust the tone reproduction curve less relative to higher area coverage amounts of the marking material.

9. The method according to claim 8, wherein the weighting of the amount of area coverage of the marking material applied comprises:
  providing relatively lower weighting to area coverage amounts determined in the subsequent periods that are relatively closest to the initial period; and
  providing relatively higher weighting to area coverage amounts determined in the subsequent periods that are relatively distant to the initial period.

10. The method according to claim 8, wherein the weighted moving average of the area coverages of the marking material is maintained separately for each location of each marking material application device within each print head of the printing apparatus.

11. The method according to claim 8, wherein the weighting of the amount of area coverage of the marking material applied produces different weighted moving averages of the area coverages of the marking material for adjacent marking material application devices within print heads of the printing apparatus.

12. The method according to claim 8, wherein the initial period and the subsequent periods comprise at least one of: time periods; and printed sheet counts.

13. The method according to claim 8, wherein the tone reproduction curve modifies job image data to compensate for image quality deviations.

14. The method according to claim 8, wherein the adjusting of the tone reproduction curve comprises altering values in a look up table (LUT).

15. A printing apparatus comprising:
  a processor; and
  a printing engine operatively connected to the processor,
  wherein the processor is adapted to periodically generate a tone reproduction curve based on printed items produced by the printing engine,
  wherein the processor is adapted to adjust the tone reproduction curve between periodic print-based generations of the tone reproduction curve by:
    determining an amount of area coverage of marking material applied by the printing engine during printing in subsequent periods following an initial period in which the tone reproduction curve was generated;
    weighting the amount of area coverage in each of the subsequent periods differently based on how distant each of the subsequent periods is from the initial period to produce a weighted moving average of area coverages of the marking material; and
    adjusting the tone reproduction curve based on the weighted moving average of the area coverages of the marking material.

16. The printing apparatus according to claim 15, wherein the weighting of the amount of area coverage of the marking material applied comprises:
  providing relatively lower weighting to area coverage amounts determined in the subsequent periods that are relatively closest to the initial period; and
  providing relatively higher weighting to area coverage amounts determined in the subsequent periods that are relatively distant to the initial period.

17. The printing apparatus according to claim 15, wherein the weighted moving average of the area coverages of the marking material is maintained separately for each location of each marking material application device within each print head of the printing engine.

18. The printing apparatus according to claim 15, wherein the weighting of the amount of area coverage of the marking material applied produces different weighted moving averages of the area coverages of the marking material for adjacent marking material application devices within print heads of the printing engine.

19. The printing apparatus according to claim 15, wherein the initial period and the subsequent periods comprise at least one of: time periods; and printed sheet counts.

20. The printing apparatus according to claim 15, wherein the tone reproduction curve modifies job image data to compensate for image quality deviations.

* * * * *